(12) United States Patent
Brown et al.

(10) Patent No.: US 8,446,030 B2
(45) Date of Patent: May 21, 2013

(54) OFFSHORE FLOATING OCEAN ENERGY SYSTEM

(75) Inventors: Neal A. Brown, San Diego, CA (US); Donald A. Innis, San Diego, CA (US)

(73) Assignee: Float Incorporated, San Diego, CA (US)

( * ) Notice: Subject to any disclaimer, the term of this patent is extended or adjusted under 35 U.S.C. 154(b) by 402 days.

(21) Appl. No.: 12/728,191

(22) Filed: Mar. 19, 2010

(65) Prior Publication Data

US 2010/0237623 A1  Sep. 23, 2010

Related U.S. Application Data

(60) Provisional application No. 61/162,151, filed on Mar. 20, 2009, provisional application No. 61/228,888, filed on Jul. 27, 2009.

(51) Int. Cl.
*F03B 13/00* (2006.01)

(52) U.S. Cl.
USPC ............................................. 290/53; 114/264

(58) Field of Classification Search
USPC ........................................................... 290/53
See application file for complete search history.

(56) References Cited

U.S. PATENT DOCUMENTS

| | | | | |
|---|---|---|---|---|
| 3,149,776 A | * | 9/1964 | Parrish | 417/100 |
| 3,490,407 A | * | 1/1970 | Dempster | 114/264 |
| 3,691,573 A | * | 9/1972 | Laudato, Jr. | 441/16 |
| 3,837,309 A | * | 9/1974 | Biewer | 114/265 |
| 4,078,871 A | * | 3/1978 | Perkins, Jr. | 417/100 |
| 4,159,427 A | * | 6/1979 | Wiedemann | 290/55 |
| 4,741,157 A | * | 5/1988 | Nishikawa | 60/398 |
| 4,864,958 A | * | 9/1989 | Belinsky | 114/265 |
| 5,375,550 A | * | 12/1994 | Innis | 114/267 |
| 6,100,600 A | * | 8/2000 | Pflanz | 290/54 |
| 6,213,045 B1 | * | 4/2001 | Gaber | 114/266 |
| 6,791,206 B1 | * | 9/2004 | Woodbridge | 290/53 |
| 7,823,525 B2 | * | 11/2010 | Brown et al. | 114/264 |
| 2006/0225634 A1 | | 10/2006 | Cho et al. | |

FOREIGN PATENT DOCUMENTS

JP  2002-317746 A  10/2002
KR  10-1999-0010006 A  2/1999

* cited by examiner

*Primary Examiner* — Joseph Waks
(74) *Attorney, Agent, or Firm* — Schwabe, Williamson & Wyatt (57) ABSTRACT

Embodiments of the present disclosure relate to the general art of energy storage and power generation, and in particular to systems for capturing and storing energy, for instance, offshore floating ocean energy systems. In various embodiments, such systems may include a pneumatically stabilized platform base coupled to a power generator and a potential energy storage device.

21 Claims, 7 Drawing Sheets

Section A-A    Section C-C

Section B-B    Section D-D
FIG. 12A     FIG. 12B

FIG. 11

FIG. 13A   FIG. 13B

OFFSHORE FLOATING OCEAN ENERGY SYSTEM

CROSS-REFERENCE TO RELATED APPLICATIONS

This application claims benefit of the filing dates of U.S. Provisional Application No. 61/162,151, filed Mar. 20, 2009, U.S. Provisional Application No. 61/228,888, filed Jul. 27, 2009, and U.S. application Ser. No. 11/569,869, which is the U.S. National Stage of International Application PCT/US04/18687, filed Jun. 9, 2004. The disclosures of all three of these applications are incorporated herein in their entirety.

TECHNICAL FIELD

Embodiments of the present disclosure relate to the general art of potential energy storage and power generation, and in particular to systems for capturing and storing energy, for instance, offshore floating ocean energy systems.

BACKGROUND

A number of renewable energy sources exist that are adapted to use forces of nature to generate power. Examples of such sources include, but are not limited to offshore wind, ocean currents, and ocean waves. These sources, however, are intermittent and/or time-variable in nature. Since their productive time intervals are not generally correlated with the time intervals of load demand, these renewables are not well accepted by the power industry.

In order to be more useful, such intermittent, but otherwise sustainable power sources must be integrated with large, readily accessible means of systemic energy storage and subsequent power production. Existing, accepted energy storage means are generally terrestrial (pumped storage), that are not readily available to offshore renewable energy sources. Those that are, such as batteries, are excessively heavy, short lived and expensive, and may be dangerous to the environment.

BRIEF DESCRIPTION OF THE DRAWINGS

Embodiments of the present disclosure will be readily understood by the following detailed description in conjunction with the accompanying drawings. Embodiments of the disclosure are illustrated by way of example and not by way of limitation in the figures of the accompanying drawings.

DETAILED DESCRIPTION OF EMBODIMENTS

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scopes of embodiments, in accordance with the present disclosure, are defined by the appended claims and their equivalents.

Various operations may be described as multiple discrete operations in turn, in a manner that may be helpful in understanding embodiments of the present disclosure; however, the order of description should not be construed to imply that these operations are necessarily order dependent.

The description may use perspective-based descriptions such as up/down, back/front, and top/bottom. Such descriptions are merely used to facilitate the discussion and are not intended to restrict the application of embodiments of the present disclosure.

The terms "coupled" and "connected," along with their derivatives, may be used. It should be understood that these terms are not intended as synonyms for each other. Rather, in particular embodiments, "connected" may be used to indicate that two or more elements are in direct physical (for instance, mechanical, hydraulic, or pneumatic) or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Disclosed herein in various embodiments are offshore floating systems for capturing and storing energy for instance from ocean waves and/or currents, tidal currents, wind, and/or the sun. In various embodiments, a pneumatically stabilized platform (PSP) may serve as both a support for a power generator and a potential energy storage unit. In various embodiments, the PSP may be coupled to and/or include one or more renewable power generators, for instance, a wave energy converter (WEC), a wind turbine, or an ocean current turbine. In one embodiment, the PSP may be coupled to a "Rho-Cee" WEC, such as those disclosed in WO/2005/095790. In other embodiments, the PSP may include both a Rho-Cee WEC and a wind turbine, ocean current turbine, and/or solar panel array. In such embodiments, the same PSP also may be used for energy storage, as described in greater detail below.

The PSP used in various embodiments may enable the operation of very large floating platforms, with superior motion stability and load capacity in challenging sea-state environments. In embodiments, the PSP may be a PSP as disclosed in U.S. patent application Ser. No. 11/569,869, which is incorporated herein by reference in its entirety.

In various embodiments, the PSP may achieve its at-sea motion stability and structural loads mitigation by decoupling the "hull" from ocean wave pressures through the use of air buoyancy, which may be both compressible and mobile. In embodiments, the air may be contained in an array of interconnected, open-bottomed, cylindrical tanks. The air may be made mobile, in various embodiments, by means of ducting. In some embodiments, the ducting arrangement may be selectable in real time to best suit the sea-state environment and platform deck loading distribution. In particular embodiments, local air pressure adjustments may be made via Roots-type blowers as needed.

In various embodiments, an elongated PSP may form the base for a comprehensive renewable energy system, as described herein. In addition to the Rho-Cee WEC described below, the PSP may also or alternatively incorporate other power generators, such as one or more wind turbines and/or deployable or retractable ocean current turbines. In various embodiments, each of these power generators may contribute energy for storage within the PSP, which can help overcome the problem in prior systems of intermittent power generation. In some embodiments, these and other uses of the PSP, for instance non-energy-related uses and marine real-estate uses, all may greatly reduce the individual capital and operating costs associated with their mutually-supporting offshore platform, which may be operating in a hostile ocean environment, for instance.

Figure 1:
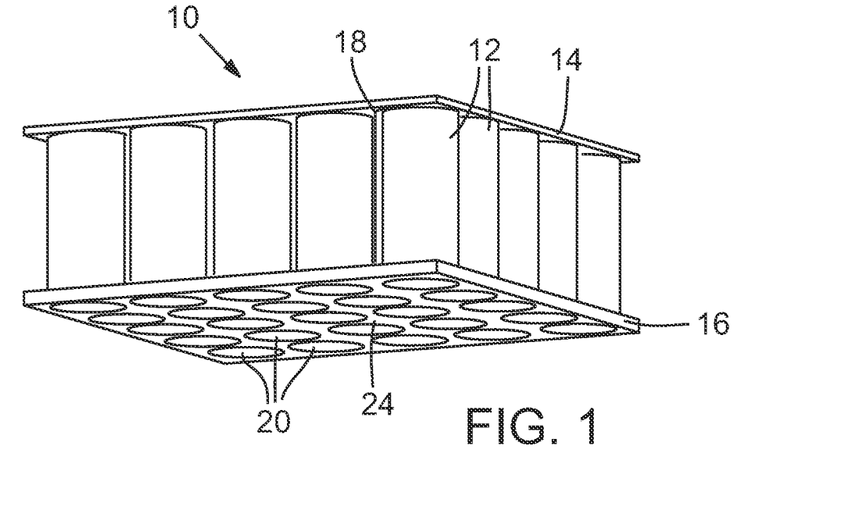
FIG. 1 illustrates a bottom perspective view of a pneumatically stabilized platform (PSP) for use in the offshore floating ocean energy systems described herein, in accordance with various embodiments.

FIG. 1 illustrates a bottom perspective view of an example of a PSP for use in accordance with various embodiments. In some embodiments, the PSP 10 may include a plurality of variable buoyancy members 12 grouped in an array. The variable buoyancy members 12 also may be joined to a top cap/plate. In various embodiments, top caps, when assembled into an array, may combine to form a platform top 14, which may provide the working base for desired floating platform operations. The variable buoyancy members 12 may include an opposite end 20 that may be open and able to allow water to enter the hollow portion of the variable buoyancy members 12. Air in the variable buoyancy members 12 may displace water inside the variable buoyancy members 12 (internal water) to a depth greater than the external water level, and may controllably provide buoyancy via the air volume's pressure to resiliently support the PSP 10.

In various embodiments, the buoyancy members 12 may be at least partially joined together by a bottom plate 16, and interconnected by vertical partitions 18 disposed between adjacent variable buoyancy members 12, thereby defining interstitial volumes 24. In various embodiments, interstitial volumes 24 may be made controllably watertight and/or airtight, thus providing a reserve buoyancy that may keep the top platform substantially above the water line in the event that some or all of the variable buoyancy members fail.

A described above, the offshore floating ocean energy systems of the present disclosure may include one or more devices coupled to or carried by the PSP for generating power from a variety of natural sources. With the PSP coupled to one or more types of renewable power generators, it may not only provide the supporting superstructure, but may also be a reserve for potential energy generated by the renewable power generators and, in some embodiments, it may provide a habitable base for their efficient maintenance.

Figure 2A:
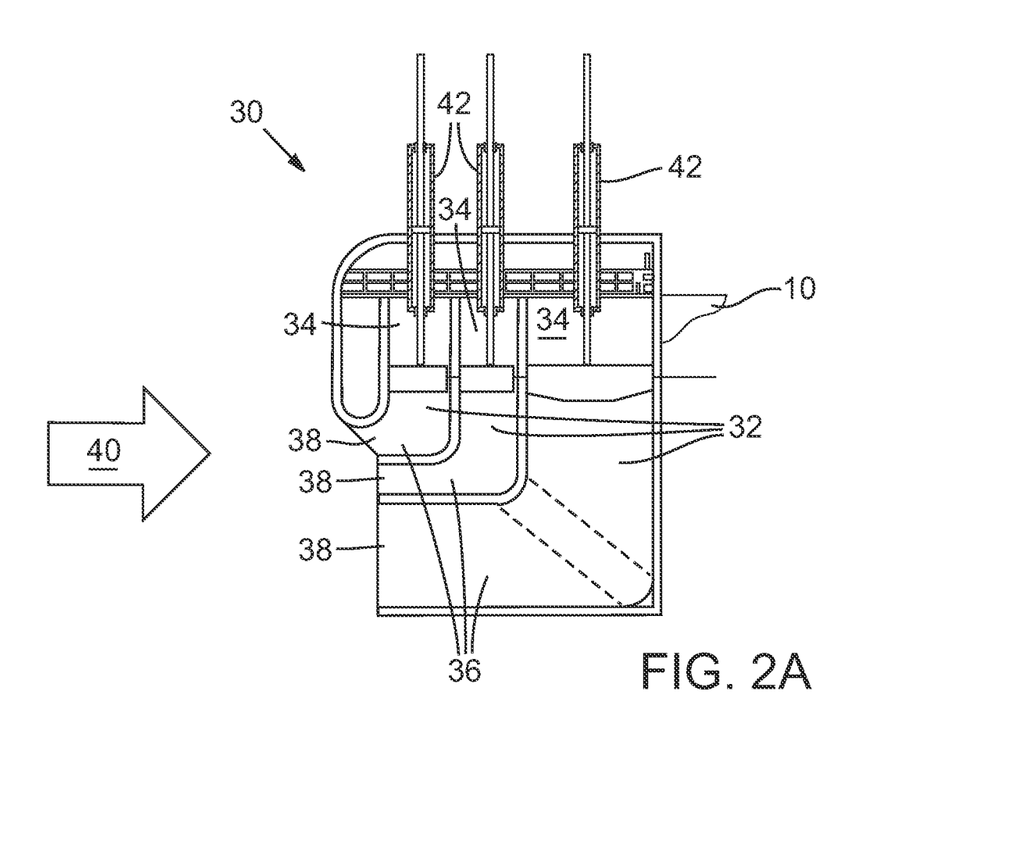
FIG. 2A illustrates a cross-sectional view of a "Rho-Cee" wave energy converter (WEC), in accordance with various embodiments.

FIG. 2A illustrates a cross-sectional view of a "Rho-Cee" WEC, for use with a PSP in the offshore floating ocean energy systems described herein. As shown by way of example, a WEC 30 is coupled to PSP 10 and may include a plurality of oscillating water columns 32. Each water column 32 may include a vertical or inclined portion 34 that may bend to form a lower horizontal portion 36 or "foot." Each water column 32 may include a submerged mouth 38 disposed generally at a first end of the lower horizontal portion 36. In use, the mouth 38 may be oriented to open generally towards a principal approach direction of incident waves 40, and the WEC may include at least one above-water power takeoff device 42 responsive to the movement of liquid in the respective oscillating water columns 32.

Figure 2B:
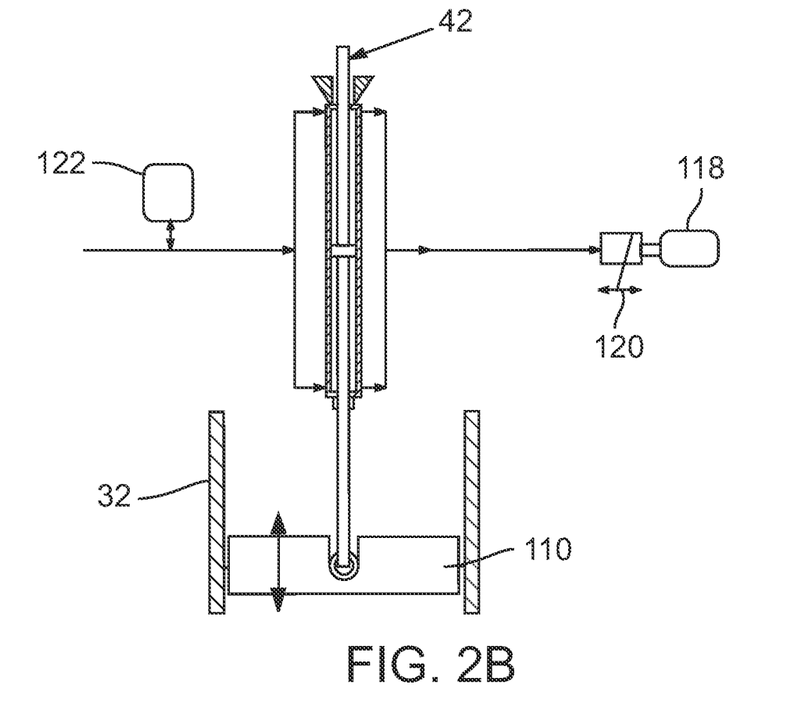
FIG. 2B illustrates an example of a hydraulic power takeoff device buoyantly coupled to an oscillating water column (OWC), in accordance with various embodiments.

FIG. 2B shows an example of an hydraulic power takeoff device 42 coupled to an oscillating water column 32 with a column-resident buoyant float or raft, in accordance with various embodiments. The power takeoff device 42 may controllably generate electricity by means of an hydraulic motor-driven generator 118 coupled to a switch 120 as the float or raft 44 rises and falls with the water level in the water column 32, driving a double-acting, long-stroke hydraulic cylinder. Energy may then be accumulated in the accumulator 122.

Figure 2C:
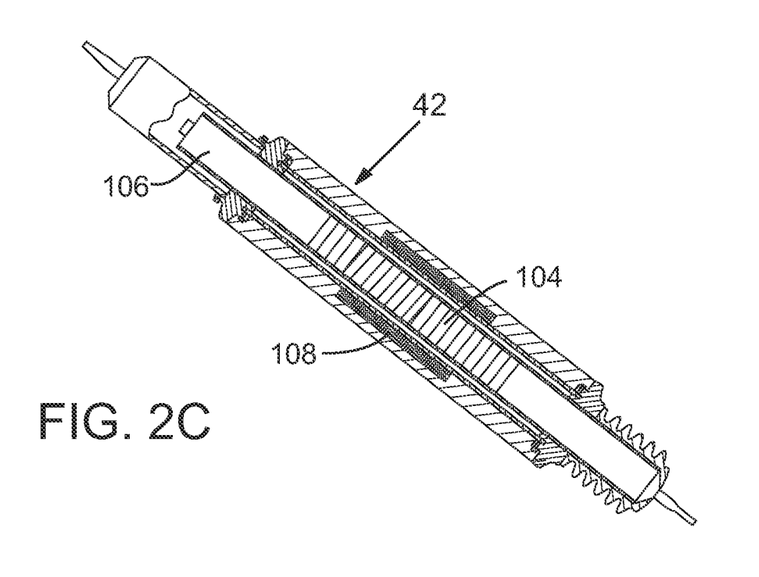
FIG. 2C illustrates an alternate embodiment of a linear generator power takeoff device buoyantly coupled to an OWC, in accordance with various embodiments.

FIG. 2C shows an alternate embodiment of a linear generator, which may function directly as an electric power takeoff device 42. In this embodiment, a field magnet 104 may be attached to a float-driven rod 106, which may move the field magnet 104 through a fixed, surrounding armature coil 108 synchronously with the vertical motion of the attached float 110, thereby inducing an alternating voltage and subsequent electric current in the armature coil 108.

Figure 2D:
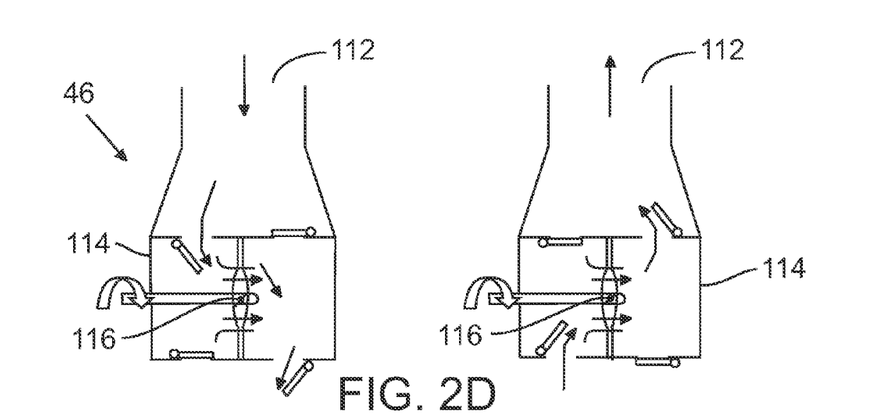
FIG. 2D shows an example of a unidirectional reaction air turbine-alternator power takeoff device pneumatically coupled to an oscillating water column, in accordance with various embodiments.

FIG. 2D shows an example of how a power takeoff device 42 may take the form of a unidirectional reaction turbine 46 driving a generator, the turbine being pneumatically coupled to the oscillating water column 32. In this embodiment, the upward motion of the liquid in the oscillating water column 32 (FIG. 2D, right) may displace and move a portion of the air contained above the liquid surface (not shown) through ducting 112 to the flow direction-rectifying turbine case 114, through the turbine 116 and may exhaust to the atmosphere. On the down-stroke (FIG. 2D, left), air may be drawn from the atmosphere, into the rectifying turbine case 114, through the turbine 116 in the same direction, and may exhaust to fill the expanding volume above the down-moving liquid surface in the column (not shown). In embodiments, the reaction turbine may be employed to take advantage of the broad efficiency characteristics of the type with regard to continuous variation of the ratio of air velocity to wheel speed.

In such embodiments, oscillating airflow between the oscillating water columns 32 and the atmosphere may drive the reaction turbines. According to various embodiments, this may produce a more efficient system than, for example, a bi-directional "Wells turbine" which is more common on conventional WECs.

In particular embodiments, long-stroke hydraulic cylinders may be used with accumulators, hydraulic motors, and controls, to maintain the desired constancy of the input impedance apparent at the submerged mouth of the WEC.

Figure 3A:
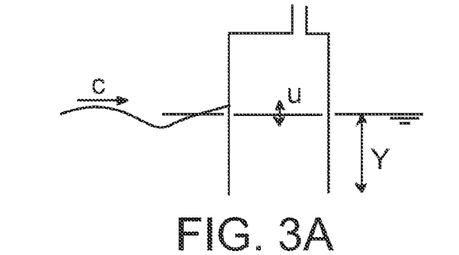
FIGS. 3A and 3B show two schematics illustrating a method of achieving wave frequency resonance in a Rho-Cee WEC and comparing an example of a conventional oscillating column with a vertically opening mouth (FIG. 3A) with an oscillating column that adds a horizontal portion having a mouth that opens horizontally (FIG. 3B), and generally toward the approach direction of incident waves, in accordance with various embodiments.
Figure 3B:
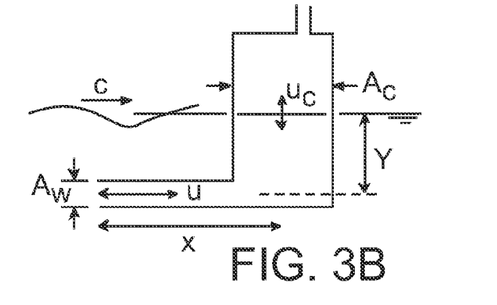

In various embodiments, the WEC may be an impedance-matched terminator that may be constructed from reinforced concrete, and in some embodiments, concrete may be the sole material in contact with sea water. In embodiments, several constraints may dictate that the impedance of the absorber elements in the WEC be quite small. Thus, in various embodiments, the operation of the oscillating water columns may be generally resonant. FIGS. 3A and 3B are a pair of schematics illustrating a method of achieving the resonant period and enhancing the capture of wave-borne energy, in accordance with various embodiments. FIG. 3A shows an example of a common configuration of a conventional oscillating column 32 in which the resonant period of oscillation, $T_0$, is proportional to the square-root of the height of the internal water column, which height is representative of the mass in an oscillatory "spring/mass" dynamical system, wherein the "spring" effect is provided by gravity:

$$T_0 = 2\pi \sqrt{\frac{Y}{g}}$$

In order to achieve a relatively long resonant period that is typical of ocean waves, the height of the water column 32, which may be commensurate with the draft of the device, may be relatively large. As the wave-borne energy, whose capture is the objective, may be found to decrease exponentially with depth, the energy available for capture will therefore be found to be significantly reduced. Also, the vertically opening mouth 38 of the column 32 will be found to be pointed perpendicular to the direction for most efficient capture of such wave-borne energy. By contrast, as shown in FIG. 3B, a portion of a vertical portion 34 of a water column 32 is bent to the horizontal 36 at a smaller depth where the available wave-borne energy is considerably greater. In embodiments, the effective mass of the oscillating water column 32 may be controllably increased by reducing the cross-sectional area of the horizontal "foot" 36 relative to that of the vertical column portion 34, or it may be controllably reduced by decreasing the horizontal length of the "foot" 36, while the "spring" and resulting resonant period, $T_0$, remain unchanged:

$$T_0 = 2\pi \sqrt{\frac{Y}{g}} \sqrt{1 + \frac{A_c}{A_w} \frac{X}{Y}}$$

Further, when pointed horizontally into the direction of the incident waves 40, the mouth 38 of the horizontal leg is optimally oriented to capture the available incident wave-borne energy. In some embodiments, several water columns may be tuned to wave frequencies with bandwidths that may span the energetic region of the yearly average incident wave energy spectrum. In embodiments, the normalized bandwidths may govern both the resistive input impedance and the output power potential of each oscillating column 32.

The principle of impedance matching, when applied to WEC energy capture in conjunction with a PSP, may, in embodiments, be expressed as follows: when forced by the doubled pressure of a blocked incident sinusoidal wave at the WEC face, the submerged mouth 38 of the water column in a Rho-Cee absorber in a WEC may sinusoidally emit and/or ingest a quantity of water that will generate a wave of the same frequency with the same amplitude as that of the unblocked incident wave, but in opposite (180 degree) phase. This may be possible, in various embodiments, if the WEC oscillator is operating at resonance, thereby presenting a small, resistive input impedance. The input impedance, when averaged over the area of the face, may beneficially be equal to the characteristic impedance of the incident wave; the value of which is denoted "Rho-Cee" ($\rho C$); the product of the mass density of sea water, $\rho$, with the celerity of the incident wave, C. In embodiments, that resistance may be controllably applied by the power take-off device 42 whereby the oscillations are converted to useful work. Thus, in certain embodiments, the generated wave may remove the doubling of the blocked incident wave and render a WEC-containing face "invisible" to the incident wave. There may then be no reflection of wave energy from the baffle; all of the incident wave's energy may be absorbed by the WEC, in accordance with various embodiments.

In particular embodiments, for deep water, the wave-making transfer function may be generally expressed as:

$$a \approx \frac{2\omega^2}{g} y_c A_c \exp(-kY)$$

and in other embodiments, in shallow water as:

$$a \approx \frac{\omega^2}{kg}\left(\frac{A_c}{A_w}\right) y_c / \cosh(k(h-Y))$$

where: a is the amplitude of the generated wave (same as that incident), $\omega$ is the radian frequency, g is the gravitational constant, $y_c$ is the amplitude of vertical motion of the water surface in the column, $A_c$ is the cross-sectional area of the column (and the water surface there), $A_w$ is the area of the submerged horizontally directed mouth, Y is the mean depth of the area $A_w$, (X being the horizontal leg mean length), k is the wave number corresponding to the frequency and the depth of water, and h is that water depth. In embodiments, the quantity ($\omega y_c A_c$) may represent, by continuity, the amplitude of the volume rate of flow into and out of the submerged mouth of the WEC.

In various embodiments, the ratio, $a/y_c$, may be directly related to the loss factor, $\eta$, which happens to be the inverse of the resonant response amplification factor, commonly referred to as "q". Additionally, $\eta$ may also be equal to the normalized bandwidth of that resonant response, be it expressed in either frequency or period.

In embodiments, the geometric arrangement of the Rho-Cee WEC may be selected to suit a set of constraints or goals. One such goal, for instance, may be that the upper edge of the submerged mouth, $A_w$, be deep enough to avoid venting in the highest waves expected, while producing power in resonance.

Figure 3C:
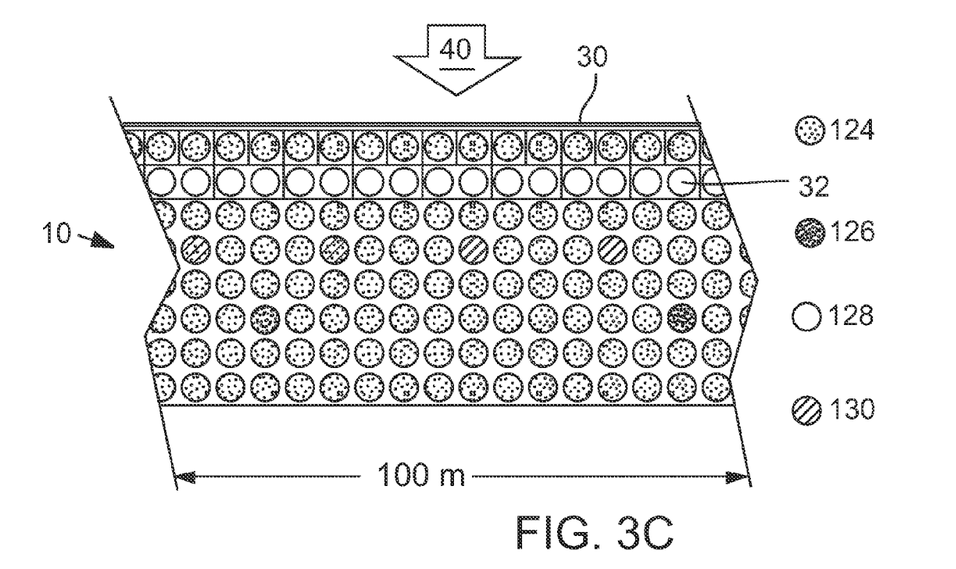
FIG. 3C illustrates, in plan section view, an embodiment of the floating ocean energy system in which nested WEC units are repeated endwise along the generally seaward edge of a PSP to form a linear array of contiguous WECs in a two-dimensional terminator configuration, as well as arrays of both wind turbines and ocean current turbines, in accordance with various embodiments.

In various embodiments, the successively-tuned water columns may be geometrically configured (for example, nested as shown in FIG. 2) to minimize space and/or weight of the reinforced concrete construction materials, and hence reduce the cost of the system. FIG. 3C illustrates an embodiment of the floating ocean energy system in which the nested units (open circles) are repeated, endwise along the edge of a PSP 10, to form a linear array of contiguous WECs in a two-dimensional terminator configuration, as shown. Referring to FIG. 3C, the open circles 128 depict open-bottom PSP buoyancy columns 32 beneath the Rho-Cee WEC 30, the light grey circles 124 depict full-height open-bottom PSP buoyancy columns 32, the dark grey circles 126 depict foundation cells for wind turbines, which cells may be closed at the bottom and locally strengthened, and the cross-hatched circles 130 depict foundations for pendant current turbines, which cells may be open at both bottom and top. In certain embodiments, the terminator WEC configuration may be aligned perpendicular to the usual propagation direction of the incident waves 40.

In various embodiments, the wave energy absorption may take place along the face length of the WEC. This is in marked contrast to "attenuators" that are aligned parallel to wave propagation, and to the various fields or "farms" of "point-absorbers". Both inherently suffer from progressively decreasing wave energy availability, front-to-rear. By contrast, a PSP incorporating a "Rho-Cee" WEC may be primarily "up-front", and suited for placement in relatively deeper water. In various embodiments, systems as disclosed may deliver about 50% of incident power, which is a "wave-to-wire" efficiency approximately twice that of any other WEC systems. Additionally, in various embodiments, coupling to the PSP allows for the WECs to position certain critical components above the water level, rather than underwater, making it more readily accessible for maintenance. Further, PSP coupling may allow for the underwater portions of the system to be made of reinforced concrete, which may improve the system's longevity and reduce the cost of its maintenance.

As described above, the offshore floating ocean energy systems of the present disclosure also may include one or more devices for storing the energy that has been captured from natural events, such as ocean waves and/or currents, tidal currents, wind, and/or the sun. In particular, in various embodiments, the PSP may be used for storing energy created by the renewable power generators in the form of potential energy In embodiments, the stored potential energy may be tapped during intervals of low natural activity (e.g. low wave activity, low wind, low current, or low sun) to better match varying demands of the load infrastructure, thereby avoiding the principle objections to renewable energy sources.

In various embodiments, the PSP, such as those described above, may be buoyantly supported afloat in large measure by pressurized air, and may allow for considerable potential energy storage therein in the form of a pressure×volume product of the internal interstitial volumes, as well as that of buoyancy air. In various embodiments, one or more blowers used for air handling in a PSP also may be used to generate power from the stored potential energy source when operated in reverse. Thus, in various embodiments, additional capital equipment need not be supplied to exploit the PSP's energy storage capability.

In various embodiments, atmospheric air may be pumped into the internal volumes of a PSP, as well as into the air buoyancy cylinders with open bottoms described above, by one or more blowers or other air-forcing devices (e.g. vane-type and Roots-type blowers). The blower or air-forcing device may be powered by the output of the supported renewable energy conversion system(s), for instance one or more WECs, as described above, where the power output is excess to the immediate load requirements of the connected infrastructure. Generally, in various embodiments, the limits of energy storage in buoyancy air may be set by the maximum attainable air pressure, which, in various embodiments, may be equal to the seawater hydrostatic pressure at the draft depth of the open-bottom air-buoyancy cylinders of the PSP. In embodiments, that pressure may be maximized, however, by the addition of ballast water weight to maintain the draft depth in contravention of the tendency of the PSP to rise in response to increased buoyancy air pressure. The elevation of ballast water may be an additional means of reversibly storing potential energy in the PSP energy system.

In some embodiments, the PSP may be raised so that the freeboard (e.g., the height above the water level) is increased and the draft equally decreased relative to a pre-charging, initial state of minimal energy content, wherein it may, for example, be assumed to be floating in equilibrium on the intact buoyancy provided by its interstitial volumes. As such, in some embodiments, the buoyancy air may be considered to be vented, residing generally at atmospheric pressure.

Figure 4:
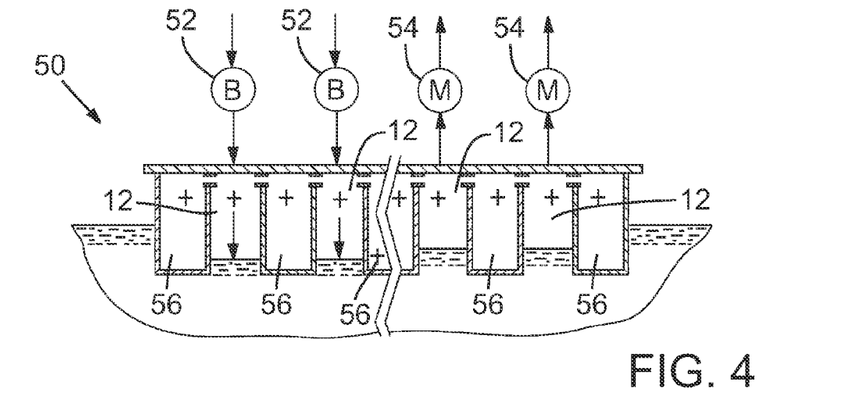
FIG. 4 illustrates a schematic diagram, in elevation view, of an example of a PSP used as a potential energy storage and power regeneration device and system, in accordance with various embodiments.

FIG. 4 illustrates a schematic diagram of an example of a PSP used as a potential energy source or storage system 50, in accordance with various embodiments. Referring to FIG. 4, an example storage system 50 is shown, where the "B" identifiers denote machines used to charge the energy storage system using excess power generated by the renewable power generators, and the "M" identifiers denote the same (or different/separate) machines generating power during pressurized air discharge of the storage system 50. In various embodiments, "B" may denote a blower 52, "M" may denote an air-motor 54 (e.g., a turbine, blower, or anything that can run a generator to generate electricity, for instance, the same blower operating in reverse), and "+" may denote an increased pressure constituting potential energy. Internal arrows indicate the motion of the air-water interface. In the output power-generation stage of operation, the pressurized air filling the internal volume of the PSP may be allowed to discharge to the atmosphere via the same blowers, which may then be operating as air-motors driving electric motors, thus operating as power generators.

Figure 5:
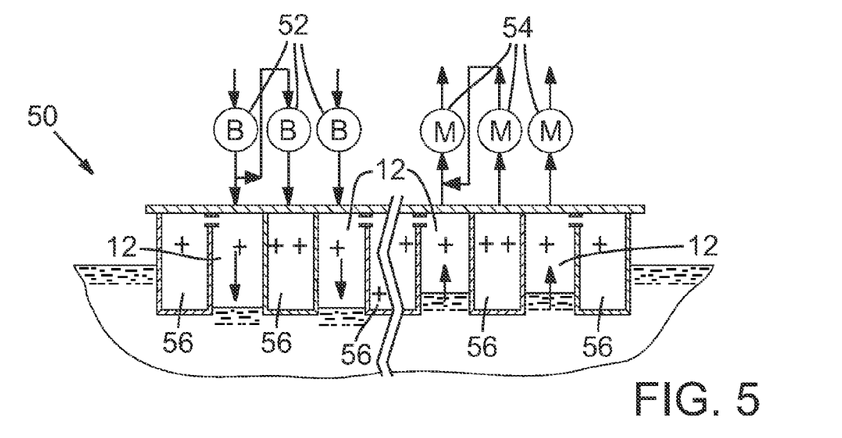
FIG. 5 illustrates a schematic diagram of a PSP potential energy storage device with closed internal interstitial volumes holding air at elevated pressures, in accordance with various embodiments.

FIG. 5 illustrates a schematic diagram of a PSP potential energy storage system 50 with interstitial volumes holding air at elevated pressures, in accordance with various embodiments. Referring to FIG. 5, in some embodiments, the bounded volumes of the interstitial spaces 56 of the PSP may be isolated from the volumes of the variable buoyancy members 12 so that they may contain air at a pressure different from that of the open bottom variable buoyancy members 12. One or more blowers 52 may be connected to take air suction from the variable buoyancy members 12 (or directly from the atmosphere) and supply it at higher pressure to the interstitial spaces 56, while the buoyancy cylinder pressure may be maintained by pumping atmospheric air, which may result in a considerable increase in stored energy. In various embodiments, generally equal volumes and a doubling of the buoyancy pressure in the interstitial spaces 56, for example, may result in an increase in potential energy of about 35%.

In accordance with various embodiments, Table 1 summarizes the approximate quantity of potential energy which may be stored in a particular PSP, per unit platform area, as a function of the pressurization applied:

TABLE 1

| pressure in buoyancy tanks bar, gauge | pressure in interstitials bar, gauge | potential energy per hectare MW-hr | potential energy per acre MW-hr |
|---|---|---|---|
| 1 | 1 | 6.7 | 2.7 |
| 1 | 2 | 9.2 | 3.7 |
| 1 | 3 | 11.7 | 4.7 |

Example PSP: 20 m height, 50% open, 90% volume

As illustrated in FIG. 5, "++" denotes nominally doubled charge air pressure produced by blowers 52 connected in series across a variable buoyancy member 12 or interstitial space 56. Higher stages of charging, for example in one atmosphere increments, may be used.

In various embodiments, the freeboard and draft of the PSP may be generally maintained by manipulating the PSP to compensate for the change in internal pressures. This may be accomplished in a variety of ways, such as by adding weight to the PSP and/or by introducing a vacuum to one or more of the cylinders. This may help increase the displacement volume equal to that of the increase in variable buoyancy cylinder air volume consequent to the pressurized air charge. This may thus increase the amount of potential energy that may be stored because of the increased air pressure achievable with the deeper draft maintained by avoiding elevation of the PSP.

Figure 6:
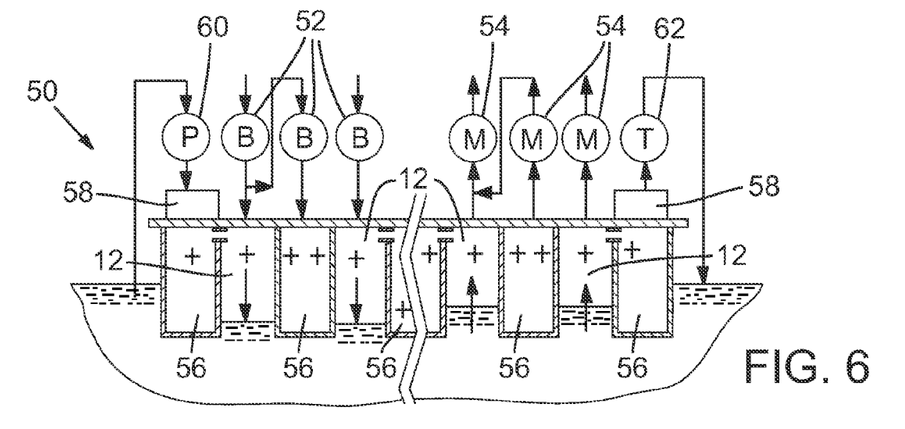
FIG. 6 illustrates a schematic diagram of a PSP potential energy storage device with water ballast reversibly residing in deck-mounted tanks, in accordance with various embodiments.

FIG. 6 illustrates a schematic diagram of a PSP potential energy storage system 50 with deck-mounted water ballast tanks 58, in accordance with various embodiments. Referring to FIG. 6, weight may be added to the platform 14 of the PSP using seawater ballast that is pumped up into tanks 58 located on or above the deck of the PSP. As illustrated, "P" denotes pump 60, generally lifting ballast water and "T" denotes turbine 62, generally the self-same pump operating in reverse.

Further, the elevation of that weight of ballast water may provide a further increase in the stored potential energy—which may require both a portion of the immediate excess renewable power generation to pump it into the tanks 58, and which may later be controllably recovered by draining the water back to the sea through water turbines 62 driving generators. Again, these water turbine 62 driving generators may be same pumps and motors that initially lifted the ballast water, and further operated using excess power created by the renewable power generators.

Figure 7:
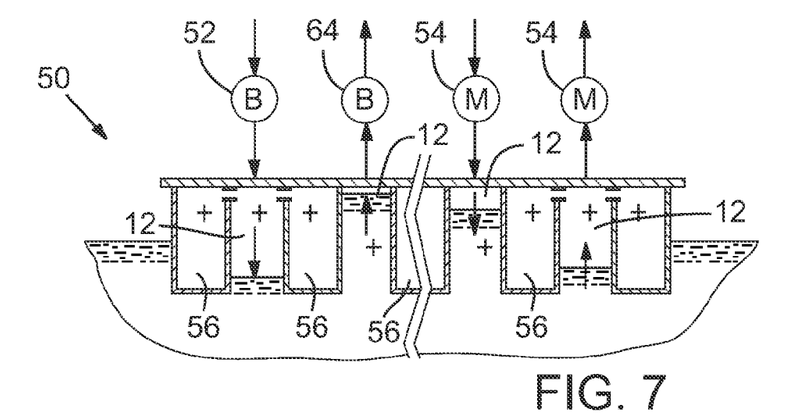
FIG. 7 illustrates a schematic diagram of a PSP potential energy storage device with buoyancy cylinder water ballast reversibly elevated by vacuum, in accordance with various embodiments.

FIG. 7 illustrates a schematic diagram of a PSP potential energy storage system 50 with cylinder water ballast elevated by vacuum, in accordance with various embodiments. Referring to FIG. 7, in some embodiments, the draft and freeboard may be maintained by pulling a vacuum 64 on some of the variable buoyancy members 12, thereby raising the water level in the variable buoyancy members 12 and enabling the atmospheric pressure to push downward on the PSP's deck with lesser upward opposing force of the reduced cylinder air pressure. The net down-force may be equivalent to that of the water raised, and its potential energy may be measured by that weight×one-half the raised height. The low pressure volume of air between the cylinder water surface and the cylinder tank top also may contribute to the potential energy stored, as a terminal state for atmospheric air.

Figure 8:
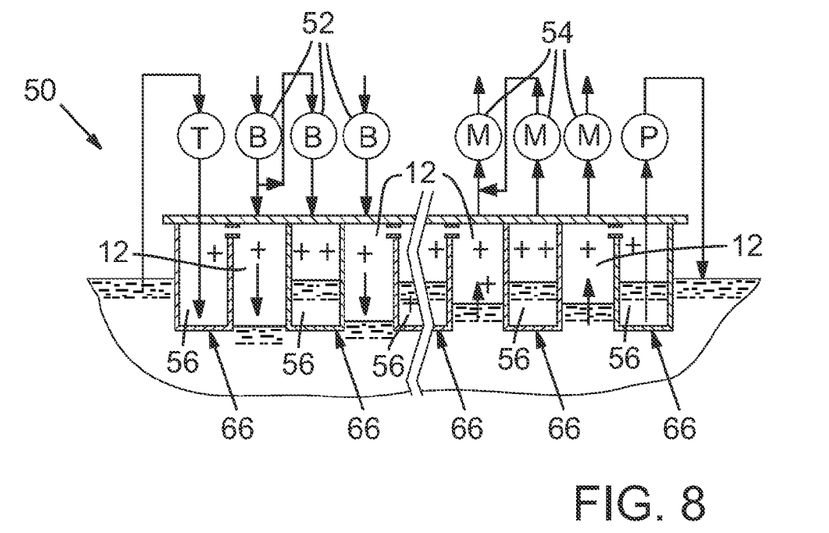
FIG. 8 illustrates a schematic diagram of a PSP potential energy storage device with ballast water reversibly residing at the bottom of the interstitial volumes, in accordance with various embodiments.

FIG. 8 illustrates a schematic diagram of a PSP potential energy storage system 50 with ballast water at the bottom of the interstitial volumes, in accordance with various embodiments. Referring to FIG. 8, in this embodiment of a PSP-based potential energy storage system 50, the added weight to maintain draft and/or freeboard may be achieved by introducing ballast water 66 into the bottoms of the interstitial spaces 56. Such water may flow from the sea to the lower level of the interstitial spaces through, for example, water turbine-generators 62, thereby adding to the excess power being utilized to drive blowers 52 (or pumps) while generating potential energy to be stored. Some of that stored potential energy may again be devoted to discharging the ballast water 66 back to the sea when returning the PSP system to its original state or in an effort to maintain the freeboard and draft during energy generation.

In another embodiment of PSP-based potential energy storage, the added weight to maintain draft and freeboard may be achieved by using a combination of the deck mounted storage tanks and the ballast water introduction to the interstitial spaces, in various proportions, with regenerative power transfer between them to help reduce the net energy loss consequent to their placement.

In various embodiments, in compressing the air when charging the PES system the temperature of air may be reduced over time by natural means. The internal energy is thereby assumed lost, leaving only the pressure×volume product as recoverable potential energy. (However, thermal insulation of the dry storage spaces may beneficially preserve some of that internal energy.) It will be understood that a power generating expansion of initially pressurized air having an initial temperature typical of the ambient, via a turbine or air-motor, will result in a discharge of atmospheric pressure air with substantially lowered temperature. This is undesirable, however, because if dampness is present in the supplied air, ice can form as a result of the temperature drop from the expansion process which can adversely obstruct the machine, causing it to halt and/or causing damage. Further, due to the exhaust temperature reduction, there may also be a reduction in the available energy. A "heat engine" may theoretically be operated between the ambient temperature and the reduced temperature of the discharge, and generate additional power.

Figure 9:
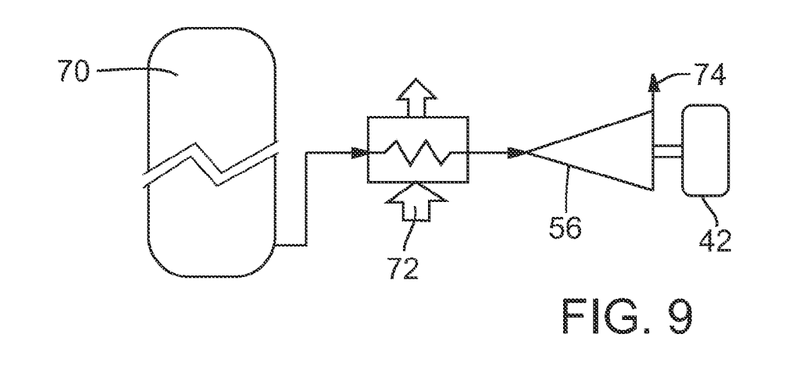
FIG. 9 illustrates a schematic diagram of a power expansion of potential energy stored as air with pre-heating, in accordance with various embodiments.

FIG. 9 illustrates a schematic diagram of the single stage power expansion of potential energy stored as air with preheating, in accordance with various embodiments. In various embodiments, the associated problems may be alleviated and power output enhanced by the controlled addition of heat to the pressurized air before and/or during the power expansion. Referring to FIG. 9, depending on the initial pressure of the pressurized air 70, appropriate quantities of heat 72 may be added to regulate the exhaust 74 temperature accordingly. In one embodiment, heat 72 may be added by the combustion of a fuel, such as natural gas or electrolysis-generated Hydrogen, to raise the exhaust temperature. In various embodiments, the exhaust temperature may be increased to at or near ambient levels, and thereby benefit from the associated additional power generation. In embodiments, the heat 72 is added to the pressurized air 70 before the pressurized air is routed through the air motor 54 to power the generator 42.

Figure 10:
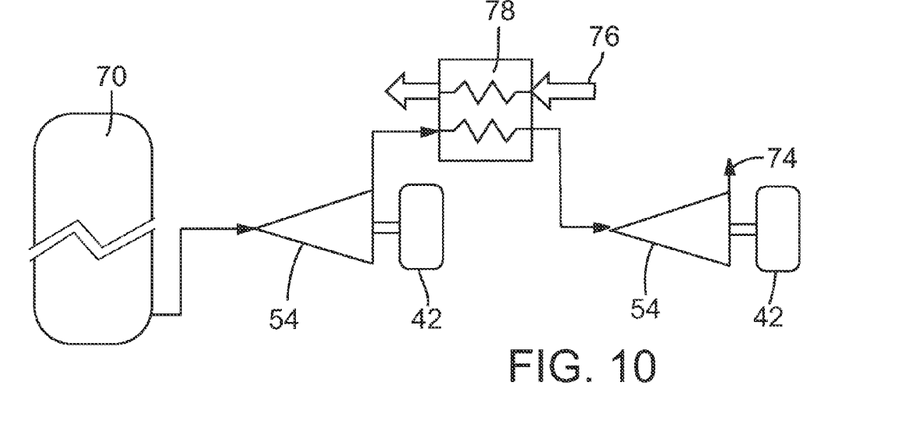
FIG. 10 illustrates a schematic diagram of power expansion of potential energy stored as air with inter-stage reheating by seawater, in accordance with various embodiments.

In various embodiments, multi stage heating may be utilized, as the pressure of the stored pressurized air 70 may be raised incrementally by various generators 42, for example by one atmosphere, or less. It is therefore possible to add heat 72 before each expansion through a series-connected set of air-motors 54, each of which drops the air pressure by an incremental amount. FIG. 10 illustrates a schematic diagram of the power expansion of potential energy stored as air with interstage reheating by seawater, in accordance with various embodiments.

Referring to FIG. 10, in various embodiments, the necessary heat may be added by seawater 76 that is at or near ambient temperature though use of a typical heat exchanger 78 arrangement. A series of heat exchangers 78 may be used to provide for the necessary heating of the air during expansion, while also minimizing the decrease in the temperature of the sea water to lessen the impact on biologic life forms carried by the seawater.

The forgoing figures are schematic only and exemplary in nature. They are not intended to represent accurate geometry, arrangement or details of the PSP or offshore floating ocean energy system in accordance with various embodiments. While buoyancy air cylinders are depicted with bottoms open to the sea and interstitial volumes are depicted with closed bottoms, generally interleaved with air cylinders, other variants are contemplated within the scope of the disclosure. Where operable, air duct connections may be depicted between air cylinders and interstitials just below the nominal "deck," but may be placed along the length of either, or above them, as desired. While in the illustrated embodiments, the left side of the diagram generally is used to depict the process of charging the system with atmospheric pressurized air and the right side depicts the generation of power via the subsequent discharge of that air, back to the atmosphere, alternate arrangements may be used.

Figure 11:
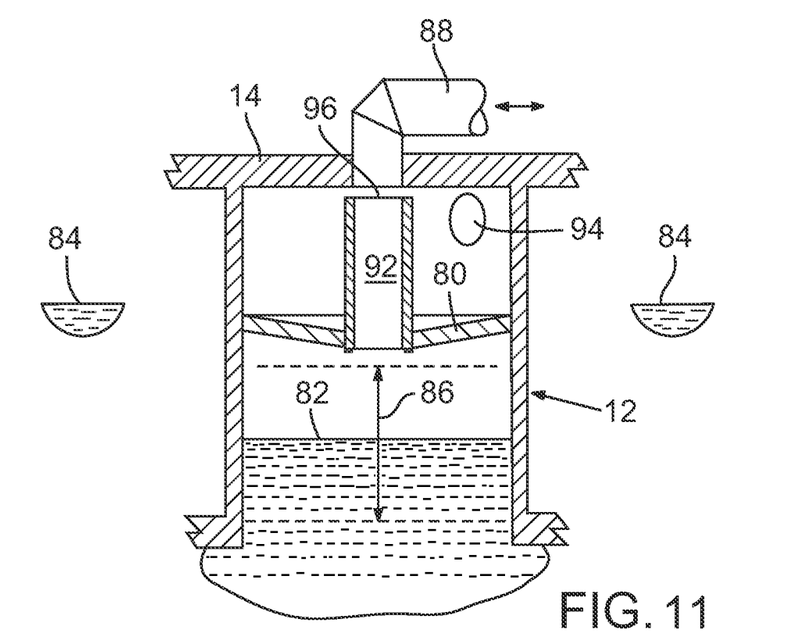
FIG. 11 illustrates a PSP air-buoyancy cylinder with a reserve buoyancy safety bulkhead, in accordance with various embodiments.

Turning to another related feature of the system, in some embodiments, the PSP may be adapted to remain buoyant in the event of a hypothetical total loss of air pressure, for instance, due to gross collision damage, physical attack, or negligence. FIG. 11 illustrates a variable buoyancy member 12 with a reserve buoyancy safety bulkhead 80, in accordance with various embodiments. Referring to FIG. 11, in various embodiments, a safety bulkhead 80 may close off a variable buoyancy member 12 at a height somewhat above the normal upper limit of water level oscillation 86 when exposed to the ocean wave environment and/or supported variable deck loads. In some embodiments, the safety bulkhead 80 may be substantially circular and/or substantially horizontal. In embodiments, the water level 82 in the variable buoyancy member 12 may be depressed relative to that of the sea surface 84 by the pressure of the buoyancy-providing air. To preserve the mobility of buoyancy air with the rise and fall of the water level 82, the safety bulkhead 80 may be transected by a substantially vertical duct 92 that may conduct air to an inter-cylinder ducting system 88 above the top deck 14, or alternatively, to a below-deck ducting system 94.

In embodiments, the compressible below-bulkhead air may be allowed to communicate with the compressible, above-bulkhead air volume by means of an air-flow-gap 96. In particular embodiments, the vertical duct 92 may stop short of the top deck 14 by a space not less in height than about one-quarter of the inside diameter of the vertical duct 92. In embodiments, if the vertical duct 92 is placed in contact with the deck 14, for instance, for structural reasons, an equivalent area of through-wall duct perforations may be provided, for instance, at the greatest height practicable. In some embodiments, for instance, to prevent splash-over, an annular slide valve (not shown) may be fitted to the inside of the vertical duct 92 to close the air-gap 96 when the valve is buoyantly lifted by rising water that may be oscillating in the vertical duct 92. In some embodiments, the valve may not be lifted by the motion of the air in normal operation.

Figures 12A, 12B:
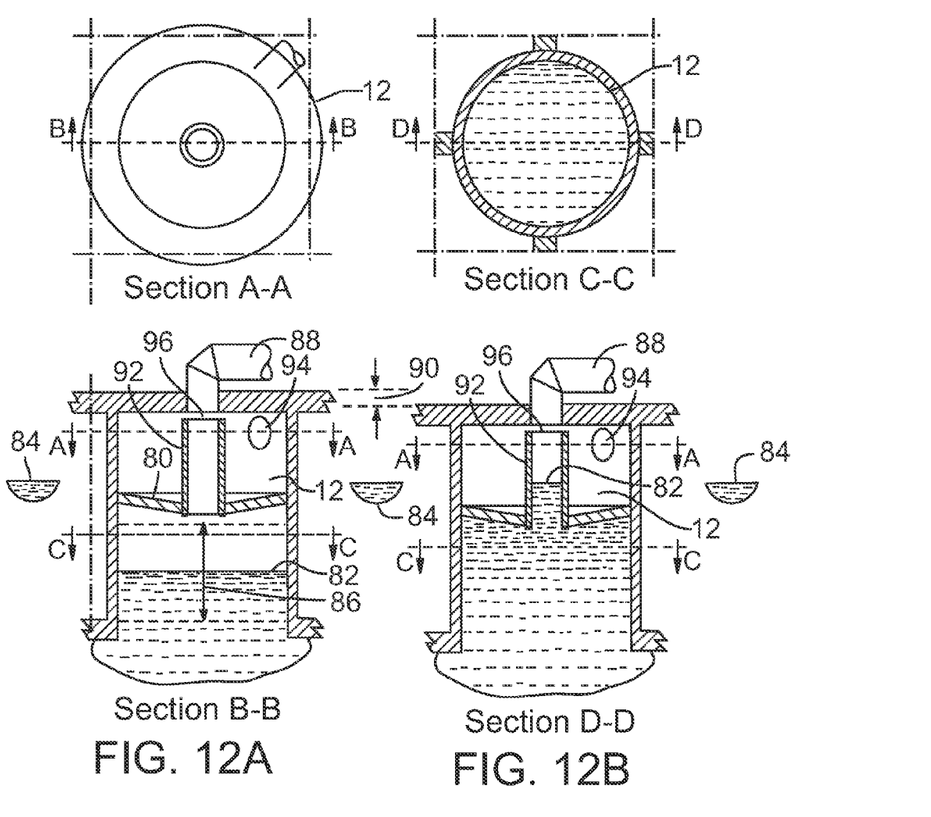
FIG. 12 illustrates four views of an embodiment of a pneumatically-stabilized platform (PSP) air-buoyancy cylinder with a reserve buoyancy safety bulkhead, in accordance with various embodiments.

FIG. 12 illustrates four views of an embodiment of a variable buoyancy member 12 with a reserve buoyancy safety bulkhead 80 installed. Referring to FIG. 12, FIGS. 12A and 12C show a cross-sectional view (FIG. 12A) and a cutaway view (FIG. 12B) of a safety bulkhead-equipped variable buoyancy member 12 in normal operation wherein pressurized air depresses the water level 82 to below that of the sea surface 84, thereby displacing water of a weight equal to the obtained buoyancy. Under wave action or during the process of supporting variations of deck-load, the water level may vary through a vertical range indicated by the double-pointed arrow 86. In embodiments, the motion of air in and out of the PSP variable air-buoyancy member 12 via the connected air duct 88 may be unimpeded.

FIGS. 12B and 12D show, by way of comparison with FIGS. 12A and 11C, a cross-sectional view (FIG. 12B) and a cutaway view (FIG. 12D) of an embodiment of a safety bulkhead-equipped PSP variable air-buoyancy member 12 under conditions resulting in a loss of air pressure, for instance, a total loss of air pressure, wherein the water level in the PSP variable air-buoyancy member 12 may rise to about the level of the surrounding waters, and in embodiments, into the air duct 88. In various embodiments, under these conditions, the safety bulkhead 80 and air duct 88 may bound a volume of atmospheric-pressure air, providing a buoyancy force equal to that of the weight of water still displaced. The resulting sinkage 90, indicated between FIGS. 12B and 12D, may generally be small enough to preserve an adequate freeboard (e.g., the height of deck above water level) for safety.

Figure 13A:
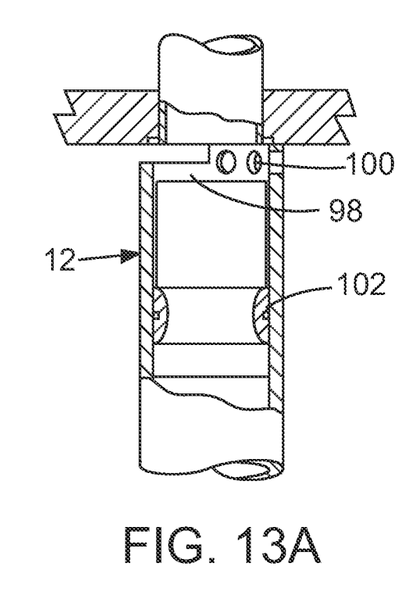
FIG. 13 illustrates a PSP air-buoyancy cylinder with a reserve buoyancy safety bulkhead in operation, in accordance with various embodiments.
Figure 13B:
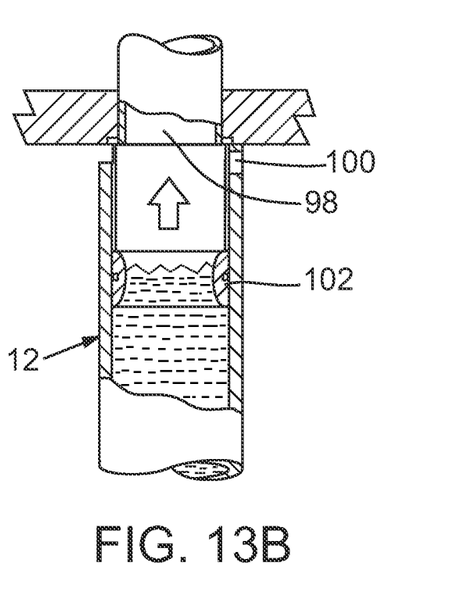

FIG. 13 illustrates a portion of a variable air-buoyancy member 12 with a reserve buoyancy safety bulkhead 80 and a sleeve 98 in an open (FIG. 13A) and closed (FIG. 13B) position, in accordance with various embodiments. Referring to FIG. 13, in some embodiments, a sleeve 98 may be positioned within the variable air-buoyancy member 12 and adapted to move vertically therewithin. In various embodiments, in order to prevent rising water from passing through the upper passages 88, the sleeve 98 may slide in an upward direction to cover the upper passages 100.

In embodiments, movement of the sleeve 98 may be controlled in a variety of ways. In one embodiment, an annular float 102 may be disposed within the variable buoyancy member 12 and adapted to engage the sleeve 98 and move vertically within the variable buoyancy member 12. According to embodiments, as the water level 70 rises, it may cause the float 102 to rise. In various embodiments, the float 102 may engage the bottom of the sleeve 98 and may urge the sleeve 98 to slide upward, thus covering the upper passages 100 and maintaining the reserve buoyancy. In other embodiments, different closure mechanisms may be used, such as rotating sleeves, shuttered apertures, and the like.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the

We claim the following:

1. An offshore floating energy system comprising:
 a pneumatically stabilized platform (PSP) including a plurality of vertical buoyancy members open at a bottom portion and a plurality of interstitial volumes defined therebetween;
 a renewable power generator coupled to the PSP and adapted to generate power based on natural conditions; and
 wherein the PSP serves as a potential energy storage device that stores unused or unneeded potential energy released by the renewable power generator generally in the form of pressurized air;
 wherein the potential energy storage device comprises a plurality of blowers configured to supply pressurized air to one or more of the vertical buoyancy members and/or interstitial volumes of the PSP, and wherein the blower is driven by power from the renewable power generator.

2. The offshore floating energy system of claim 1, wherein the renewable power generator comprises a wave energy converter (WEC).

3. The offshore floating energy system of claim 2, wherein the WEC is a Rho-Cee WEC.

4. The offshore floating energy system of claim 2, wherein the WEC is structurally integrated with, and controllably oriented by the PSP.

5. The offshore floating energy system of claim 2, wherein the WEC is comprises a plurality of oscillating water columns, wherein each oscillating column comprises a mouth, and wherein the mouth of each oscillating column is oriented substantially toward a direction from which an incident wave system approaches.

6. The offshore floating energy system of claim 1, wherein components of the renewable power generator and/or potential energy storage device are dry-serviceable from above a water surface.

7. The offshore floating energy system of claim 1, wherein the renewable power generator comprises one or more of a wind turbine, solar panel array or ocean current turbine.

8. The offshore floating energy system of claim 1, further comprising one or more air motors adapted to drive an electrical generator when the pressurized air is released from the one or more vertical buoyancy members and interstitial volumes.

9. The offshore floating energy system of claim 1, wherein the blower functions as an air-motor for driving an electrical generator when operated in reverse.

10. The offshore floating energy system of claim 1, wherein potential energy is stored by the potential energy storage device when the renewable power generator generates power in excess of a system output requirement, and wherein power is produced from the potential energy storage device when the renewable power generator generates less power than the system output requirement.

11. The offshore floating energy system of claim 1, wherein releasing potential energy from the potential energy storage device comprises heating the pressurized air before it passes through an air motor.

12. The offshore floating energy system of claim 11, wherein heat is supplied by one or more of the following heat generators: combustion of a stored hydrocarbon fuel, combustion of a stored hydrogen gas self-produced by electrolysis, interface with ambient sea-water, and electrical resistance heating using a portion of the stored potential energy.

13. A pneumatically stabilized platform (PSP)-based stored energy regeneration system comprising a system wherein air is pressurized into an internal volume of the PSP by an air forcing device driven by an electric motor for pressurizing air, wherein the air-forcing device is configured to be operable in a forward mode and in a reverse mode and functions as an air-motor for driving an electrical generator when operated in the reverse mode, and wherein the air forcing device is driven by power from a renewable power generator.

14. The pneumatically stabilized platform PSP-based stored energy regeneration system of claim 13, wherein potential energy is stored when the power generator generates power in excess of a system output requirement, and wherein potential energy is released when the power generator generates less power than the system output requirement.

15. The pneumatically stabilized platform (PSP)-based stored energy regeneration system of claim 13, wherein releasing potential energy from the stored energy regeneration system comprises heating pressurized air before it passes through an air motor.

16. The pneumatically stabilized platform (PSP)-based stored energy regeneration system of claim 15, wherein heat is supplied by combustion of a stored hydrocarbon fuel, by combustion of a stored hydrogen gas self-produced by electrolysis, by addition of warm sea-water, or by electrical resistance heating using a portion of the stored power.

17. The pneumatically stabilized platform PSP-based stored energy regeneration system of claim 13, wherein a height of a freeboard is maintained at a predetermined level.

18. The pneumatically stabilized platform (PSP)-based stored energy regeneration system of claim 17, wherein the height of the freeboard is maintained at a predetermined level by adding ballast to an interstitial space, by raising a water level in a variable buoyancy member by evacuating air from the variable buoyancy member, by adding weight to a top deck in the form of water, or by a combination thereof.

19. A method of generating and storing potential energy in a PSP, comprising:
 generating power using a renewable power generator coupled to the PSP; and
 storing potential energy in a PSP-integrated energy storage device by pressurizing air in one or more defined volumes of the PSP, wherein pressurizing air in one or more defined volumes of the PSP comprises using an air forcing device driven by an electric motor to pressurize the air into the compartment; and driving the air forcing device by power venerated by the renewable power generator.

20. The method of claim 19, further comprising releasing the pressurized air from the PSP-integrated energy storage device through an air-motor to drive an electric generator.

21. The method of claim 19, wherein using the air-motor comprises operating the air-forcing device in a reverse mode, and wherein driving the electric generator comprises operating the electric motor in a reverse mode.

* * * * *

UNITED STATES PATENT AND TRADEMARK OFFICE
CERTIFICATE OF CORRECTION

PATENT NO.         : 8,446,030 B2
APPLICATION NO.    : 12/728191
DATED              : May 21, 2013
INVENTOR(S)        : Neal A. Brown and Donald A. Innis It is certified that error appears in the above-identified patent and that said Letters Patent is hereby corrected as shown below:

In the Claims

Column 13

Line 36, "...the WEC is comprises..." should read --...the WEC comprises....--.

Column 14

Line 17, "...PSP..." should read --...(PSP)....--.
Line 35, "...PSP..." should read --...(PSP)....--.
Line 56, "...venerated..." should read --...generated....--.

Signed and Sealed this
Nineteenth Day of May, 2015

Michelle K. Lee
*Director of the United States Patent and Trademark Office*